United States Patent [19]
Jakubowski, Jr. et al.

[11] Patent Number: 6,009,788
[45] Date of Patent: Jan. 4, 2000

[54] VARIABLE FLOW-RESTRICTING DEVICE AND METHOD

[75] Inventors: Thaddeus Jakubowski, Jr., St. Cloud; John K. Foster, Florissant, both of Mo.

[73] Assignee: McDonnell Douglas Corporation, St. Louis, Mo.

[21] Appl. No.: 08/988,022

[22] Filed: Dec. 10, 1997

[51] Int. Cl.⁷ ............... B64D 1/04; E03B 65/20; F16K 5/10
[52] U.S. Cl. .............. 89/1.59; 137/607; 251/208
[58] Field of Search ............ 244/137.4; 137/607; 251/208; 89/1.54, 1.57, 1.59

[56] References Cited

U.S. PATENT DOCUMENTS

| | | | |
|---|---|---|---|
| 2,613,906 | 10/1952 | Weimar | 251/208 |
| 2,999,512 | 9/1961 | Barkow | 251/208 |
| 3,127,071 | 3/1964 | Bingham | 222/380 |
| 3,883,097 | 5/1975 | Billot | 244/137 R |
| 4,043,525 | 8/1977 | Jakubowski, Jr. | |
| 4,246,472 | 1/1981 | Sun et al. | 235/401 |
| 4,399,968 | 8/1983 | Stock et al. | 244/137 R |
| 4,516,606 | 5/1985 | Worley | 137/625.3 |
| 4,671,314 | 6/1987 | Heil | |
| 5,054,521 | 10/1991 | Hendrick | 137/625.31 |
| 5,365,978 | 11/1994 | Woods | 137/614.11 |
| 5,370,358 | 12/1994 | Hunter et al. | 251/208 |
| 5,487,322 | 1/1996 | Rhodes | 89/1.56 |
| 5,583,312 | 12/1996 | Jakubowski, Jr. | |
| 5,704,588 | 1/1998 | Korfgen et al. | 251/208 |

FOREIGN PATENT DOCUMENTS

| | | |
|---|---|---|
| 2211107 | 6/1989 | United Kingdom . |
| WO89/0593 | 6/1989 | WIPO . |

Primary Examiner—Theresa M. Wesson
Attorney, Agent, or Firm—Alston & Bird LLP

[57] ABSTRACT

A variable flow-restricting and apportioning device for an aircraft ejector rack system having a pair of fluid-actuated thrusters includes a pair of rotatable feed conduits for supplying pressurized fluid to the thrusters. Each feed conduit has an exit flow passage at its exit end which is eccentric relative to the longitudinal axis about which the conduit is rotatable, and the exit end of each feed conduit slidably fits into a female receptacle in a receiver in fluid communication with one of the thrusters. Each receptacle includes a mating face therein which has a receiver port for supplying fluid to the respective thruster. The receiver port is eccentric relative to the rotational axis of the feed conduit. Rotating each feed conduit relative to the respective receiver causes varying degree of overlap between the eccentric exit flow passages and the eccentric receiver ports, thereby defining variable-size flow orifices at each receiver.

17 Claims, 2 Drawing Sheets

VARIABLE FLOW-RESTRICTING DEVICE AND METHOD

FIELD OF THE INVENTION

The present invention relates to a device and method for variably restricting flow of pressurized fluid from a source to a fluid-actuated device and, more particularly, to a device and method for variably restricting and apportioning pressurized fluid to one or more fluid-actuated thrusters of an aircraft ejector rack system.

BACKGROUND OF THE INVENTION

An aircraft ejector rack is used for forcibly ejecting stores carried by an aircraft during flight so that the stores are safely ejected away from the aircraft. An ejector rack typically includes a pair of piston-and-cylinder type thrusters which have reciprocating rams operated by pressurized fluid, such as gas generated by a pyrotechnic device or stored in an accumulator. The thrusters are arranged generally parallel and spaced apart along the length of a store. Simultaneous operation of the thrusters causes the store to be rapidly accelerated and ejected.

A requirement often imposed on ejector racks is the capability of selectively varying the flow rate of pressurized fluid to the thrusters, both to control the energy level imposed on the store as well as to control pitch rate of the store as it is ejected. One method of selectively varying the flow rate to the thrusters has been to incorporate a removable and replaceable orifice device between the source of pressurized fluid and the thrusters. The replaceable orifice device typically is a threaded plug or insertable rod having a metering orifice which is placed in the flow path. Disadvantages of such ejector systems include the necessity to at least partially disassemble the ejector in order to change the orifice device, and the need for maintaining an inventory of various sizes of orifices.

An alternative to ejectors with replaceable orifices is described in U.S. Pat. No. 4,043,525, assigned to the assignee of the present application and incorporated entirely herein by reference. The ejector disclosed in the '525 patent has a variable orificing device which permits variable apportioning of flow between the thrusters without disassembling the ejector. The device includes a pressure chamber having an inlet through which pressurized fluid enters and two outlets through which the fluid passes to the forward and aft thrusters, respectively. A metering cylinder or rod is disposed in the pressure chamber and can be rotated within the chamber or, alternatively, translated within the chamber, to simultaneously vary the flow through the two outlets. The flow-apportioning device described in the '525 patent is highly effective. However, incorporating the flow-apportioning device into an ejector rack necessitates the addition of several precision-machined mechanical components. Accordingly, the device increases the size, weight, and manufacturing and assembly costs of an ejector rack.

SUMMARY OF THE INVENTION

The present invention provides a device and method for variably restricting and apportioning flow which enable the device to be incorporated into an ejector system with virtually no increase in weight or mechanical complexity. To this end, the device includes a manifold which is adapted to receive pressurized fluid from a suitable source. A pair of feed conduits are coupled to the manifold for supplying fluid to the pair of thrusters of the ejector. Each of the feed conduits is rotatable about its longitudinal axis with respect to the manifold. At the exit end of each feed conduit is a receiver, each receiver being adapted to receive pressurized fluid from one of the feed conduits and supply the fluid to one of the thrusters. The feed conduits are rotatably coupled to the receivers. The exit end of each feed conduit defines an exit flow passage that is eccentric relative to the longitudinal axis of the conduit. Each receiver includes a mating face having a receiver port for receiving fluid from the respective conduit. The exit end of each feed conduit is positioned in opposing fluid-tight relation with the mating face of the respective receiver such that the receiver port is eccentric relative to the conduit's longitudinal axis. The exit flow passages and receiver ports are configured such that in at least some rotational positions of the feed conduits the exit flow passages and the receiver ports at least partially overlap. Thus, rotation of the feed conduits about their axes causes varying degree of overlap between the exit flow passages of the conduits and the receiver ports, thereby defining variable-size flow orifices at the receivers.

The variable orificing may alternatively be accomplished at the manifold instead of at the receivers, in which case the inlet ends of the conduits have the eccentric flow passages and the manifold has the eccentric ports.

Furthermore, although it is preferable to incorporate variable orificing on both sides of the manifold (i.e., for both of the thrusters), an alternative embodiment of the invention employs only one rotatable feed conduit having an eccentric inlet or exit flow passage and the corresponding manifold exit or receiver has the eccentric port.

The variable orificing is preferably accomplished at the receiver, and the mating face of the receiver is preferably recessed within a female receptacle of the receiver. The exit end of the feed conduit slidably fits into the receptacle and is biased by a force toward the mating face so that the exit end of the conduit is in fluid-tight relationship with the mating face to prevent leakage of pressurized fluid at the interface. The biasing force is provided by compression springs disposed between the manifold and flanges on the feed conduits. Alternatively or additionally, the biasing force is provided by fluid pressure acting on internal surfaces of the conduits, by making the internal diameter of the conduits smaller at the exit ends than at the inlet ends.

To accommodate rotational and translational movement of the feed conduits with respect to the manifold, the manifold preferably includes supply passages into which the inlet ends of the conduits slidably fit in fluid-tight fashion so that fluid-tight connections between the manifold and the feed conduits are maintained during rotation and translation of the conduits.

The device preferably includes indexing mechanisms for placing and securing each of the feed conduits in one or more predetermined rotational positions with respect to the receivers. In one embodiment, the indexing mechanism includes a series of detents at the exit end of the feed conduit and circumferentially spaced therearound, and at least one engaging member on the receiver for selectively engaging one of the detents.

Additional features, objects, and advantages of the invention will become apparent and the invention will be better understood by reference to the following detailed description of a specific embodiment of the invention, taken in conjunction with the accompanying drawings. However, the invention is not limited to this specific embodiment.

DETAILED DESCRIPTION OF THE DRAWINGS

Figure 1:
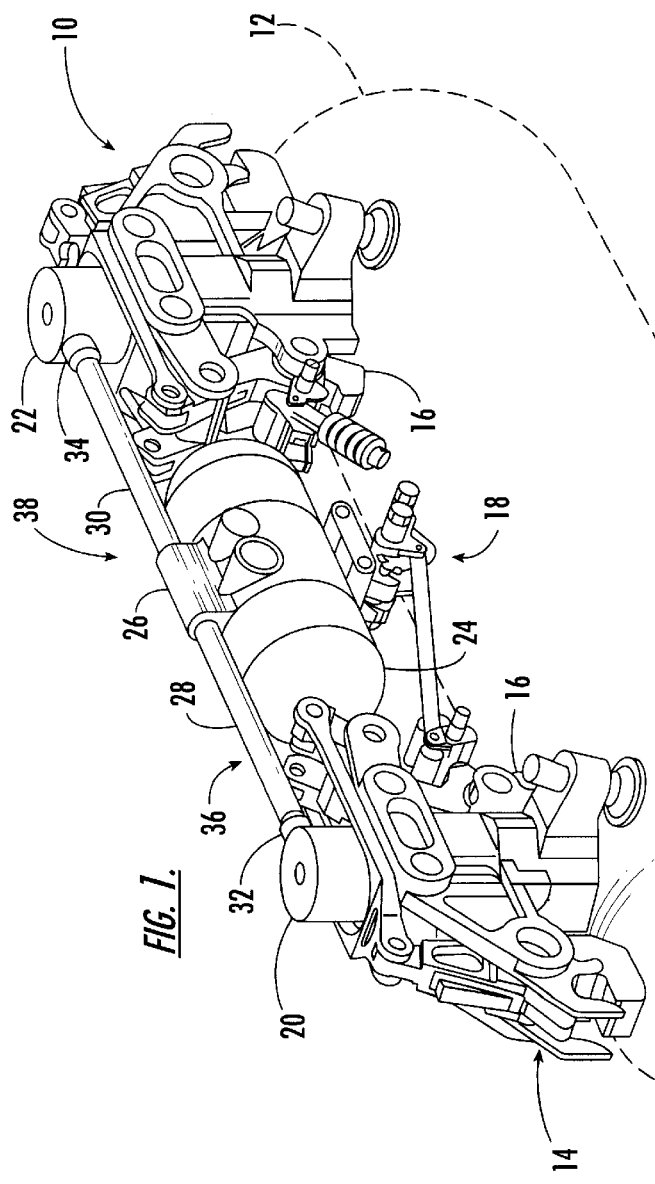
FIG. 1 is a perspective view of an ejector rack system showing a store suspended by the rack in preparation for being ejected.

FIG. 1 shows an ejector rack system 10 of the type described in U.S. Pat. No. 4,043,525 for forcibly ejecting a store such as a weapon 12. The ejector rack system 10 includes a store carrier 14 from which the store 12 is suspended. The carrier 14 includes suspension hooks 16 which engage lugs (not shown) on the store 12, and an actuating means 18 which is mechanically linked to the suspension hooks 16 for simultaneously disengaging the hooks 16 from the lugs to release the store 12. The ejector rack system 10 also includes a pair of thrusters 20 and 22 of the piston-and-cylinder type, each thruster having a ram (not shown) which is reciprocatingly movable within the cylinder portion of the thruster for engaging and ejecting the store 12.

The thrusters 20, 22 are actuated by pressurized fluid from a suitable source such as an accumulator 24. Pressurized fluid from the accumulator 24 is fed into a manifold 26 which supplies a pair of feed conduits 28 and 30. The feed conduits 28, 30 supply pressurized fluid to the thrusters 20, 22 via receivers 32, 34, respectively, which are in fluid communication with the inner chambers (not shown) of the thrusters so that pressurized fluid supplied from the feed conduits 28, 30 acts on the pistons or rams (not shown) to cause the rams to extend from the cylinders and forcibly eject the store 12, in known manner.

Figure 2:
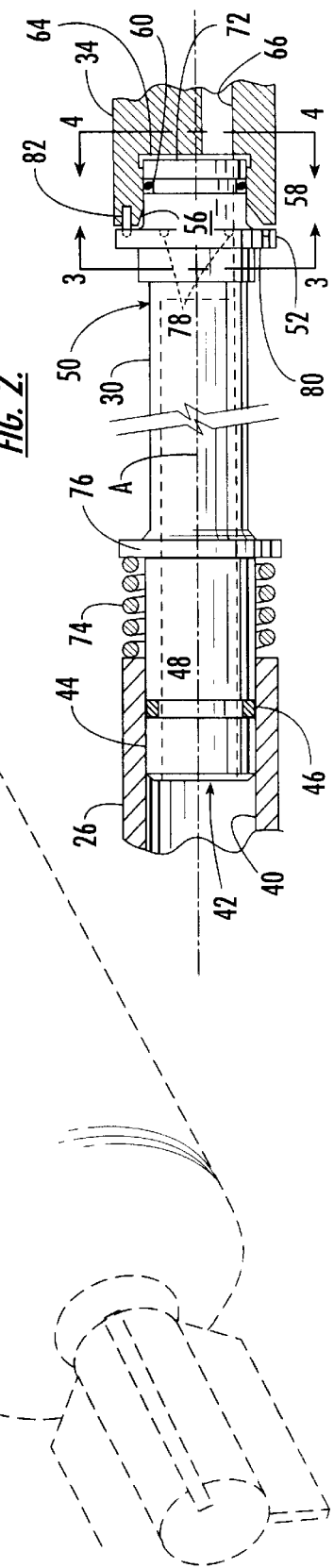
FIG. 2 is a fragmentary view, partly in section, of the flow-apportioning device as incorporated in the manifold exit, feed conduit, and receiver for one of the thrusters of the ejector rack system.

In accordance with the present invention, pressurized fluid is variably apportionable between the two thrusters 20 and 22 by virtue of variable flow-restricting devices 36 and 38 respectively associated therewith. FIG. 2 depicts the variable flow-restricting device 38 associated with the thruster 22, it being understood that the flow-restricting device 36 for the other thruster 20 is identical in construction and function. Accordingly, only the flow-restricting device 38 is described in detail hereinbelow.

The variable flow-restricting device 38 includes a manifold supply passage 40 through which pressurized fluid from accumulator 24 is supplied to the feed conduit 30. The internal surface of the supply passage 40 is a circular cylindrical surface, and the inlet end 42 of the feed conduit 30 has an outer surface 44 which is a circular cylinder just slightly smaller in diameter than that of the supply passage 40. The inlet end 42 of feed conduit 30 slidingly fits into the supply passage 40. An O-ring 46 is retained in a groove 48 in the outer surface 44 of the conduit for providing a fluid-tight seal between the supply passage 40 and the feed conduit 30.

The exit end 50 of the feed conduit 30 has a fitting 52 attached thereto which engages the receiver 34. The fitting 52 has a cylindrical outer surface 54, and the receiver 34 includes a female receptacle 56 which has an internal surface that is cylindrical and just slightly larger in diameter than the outer surface 54 of the fitting 52. An O-ring 58 retained in a groove 60 in the outer surface 54 of fitting 52 provides a fluid-tight seal between the fitting 52 and the female receptacle 56 of the receiver 34.

Thus, it will be appreciated that the feed conduit 30 may be rotated about its longitudinal axis of symmetry A with respect to the manifold 26 and the receiver 34 without disturbing the fluid-tight seals therebetween. Further, the feed conduit 30 may be translated along its longitudinal axis A without disturbing the fluid-tight seals with the manifold 26 and receiver 34, as long as the O-rings 46 and 58 remain in contact with the internal surfaces of the supply passage 40 and female receptacle 56, respectively.

Figure 3:
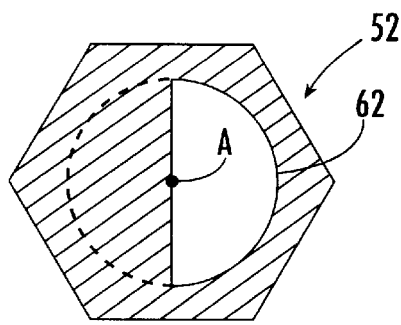
FIG. 3 is a cross-sectional view taken on line 3—3 of FIG. 2, showing the eccentric flow passage at the exit end of the feed conduit.

With reference to FIGS. 2 and 3, the fitting 52 has an exit flow passage 62 that is eccentric relative to the rotational axis A of the feed conduit 30. The exit flow passage 62 is illustrated in FIG. 3 as being one half of a circular opening which has its center coincident with the rotational axis A. However, it will be appreciated that other shapes may be used for the exit flow passage 62, as long as the passage 62 is eccentric.

Figure 4:
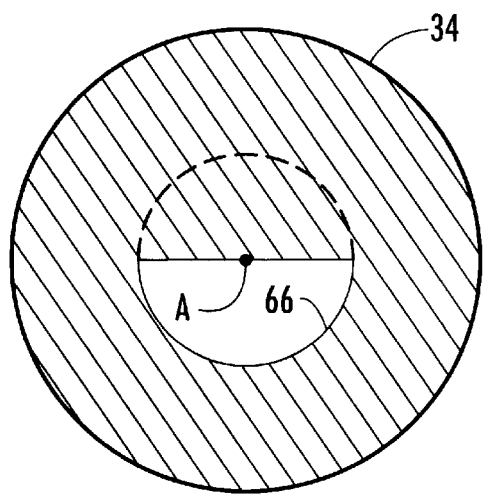
FIG. 4 is a cross-sectional view taken on line 4—4 of FIG. 2, showing the eccentric receiver port.

The female receptacle 56 of the receiver 34 has a mating face 64 (FIG. 2) which defines a terminus for the receptacle 56. A receiver port 66 originates at the mating face 64 and is in fluid communication with the thruster 22 for supplying pressurized fluid thereto. The receiver port 66 preferably is eccentric relative to the rotational axis A of the feed conduit 30. As depicted in FIG. 4, the receiver port 66 is half of a circular opening which has its center on the longitudinal axis A of the feed conduit 30. However, other shapes may be used for the receiver port 66, as long as the port 66 is eccentric with respect to the axis A.

Figure 5:
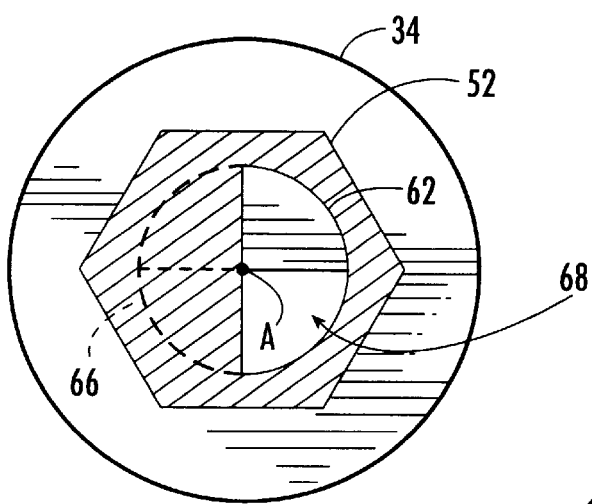
FIG. 5 is a view similar to FIG. 3, showing both the eccentric exit flow passage of the feed conduit and the eccentric receiver port partially overlapping to define a flow orifice therethrough.
Figure 6:
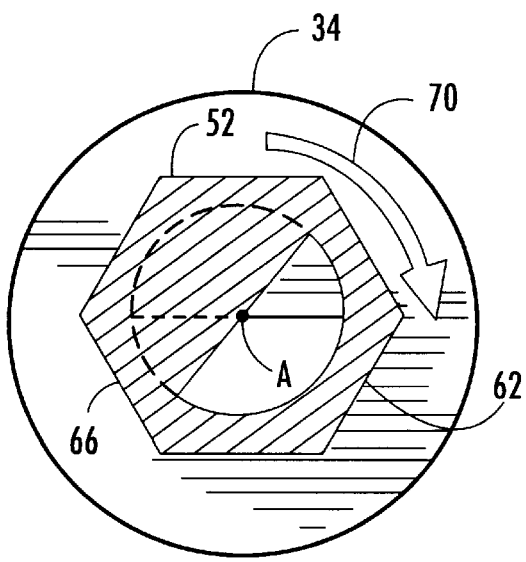
FIG. 6 is a view similar to FIG. 5, showing the flow orifice enlarged by virtue of the feed conduit having been rotated relative to the receiver.

The receiver port 66 and the exit flow passage 62 are configured such that they overlap in at least some rotational positions of the feed conduit 30. With reference to FIGS. 5 and 6, the exit flow passage 62 and receiver port 66 are shown with the feed conduit 32 in one rotational position in which a quarter-circle overlap region exists between the passage 62 and the receiver port 66 so as to define a flow orifice 68 therethrough. FIG. 6 is similar to FIG. 5, except that the feed conduit 30 and fitting 52 have been rotated about axis A as indicated by arrow 70 so as to increase the amount of overlap between passage 62 and receiver port 66. Thus, a variable orifice 68 is provided by virtue of the eccentric flow passages and rotatable feed conduit.

It will be appreciated that by configuring both the exit flow passage 62 and the receiver port 66 as half circles, it is possible to rotate the feed conduit 30 to a position in which there is no overlap between the passage 62 and the port 66. Thus, the variable orifice 68 may be completely closed. Conversely, when the two half-circle openings are coincident, the orifice 68 is fully open. Alternative configurations of the passage 62 and receiver port 66 in which there is no fully closed position of the orifice 68 may be used if desired.

Furthermore, exit flow passage 62 and the receiver port 66 need not have their geometric centers displaced from the axis A, as long as each of them has a portion whose radius measured from axis A varies with angular position about axis A, so that a varying degree of overlap is caused by rotating passage 62 relative to port 66. For instance, the port 66 may be an elongated radial slot having its center on axis A and the passage 62 may be a radial slot lying on one side of axis A. As yet another alternative, passage 62 and port 66 may be identical circles lying entirely on one side of axis A with their centers at the same radius from axis A. Thus, the term "eccentric" as used in the present specification and the claims denotes a flow passage which has at least some portion whose radius measured from the rotational axis A of the feed conduit 30 changes with angular location about the axis A. Other examples of such (eccentric shapes include ellipses, circles having their centers displaced from axis A, polygons, and ovals. Phrased differently, an "eccentric" flow passage is any flow passage having a cross-sectional shape which is not a circle centered on axis A.

Sealing of the feed conduit 30 with the receiver 34 is aided by biasing the feed conduit 30 in the direction of the mating face 64 such that the end face 72 of the fitting 52 is urged against the mating face 64. The biasing force is provided in part by a compression spring 74 disposed between the manifold 26 and a flange 76 on the feed conduit 30. Additional biasing force is provided by fluid pressure acting on internal surfaces of the feed conduit 30. Specifically, the effective internal diameter of the flow path through the feed conduit 30 is smaller at the exit end, by virtue of the half-closed opening through the fitting 52, than at the inlet end 42. Accordingly, when pressurized fluid is flowing through the feed conduit 30, fluid pressure acting on the internal surfaces results in a net force on the feed conduit 30 in the direction of the mating face 64. Any configuration of feed conduit 30 which results in a smaller effective diameter at the exit end than at the inlet end will provide this fluid pressure biasing force. The combination of spring biasing force and fluid pressure biasing force insures that the end face 72 of the fitting 52 is firmly seated against the mating face 64 of the receiver 34 so that no significant flow leakage occurs through the variable orifice 68 when it is fully closed, and also insures that the fitting 52 remains engaged in the female receptacle 56 of the receiver 34.

As previously noted, the ejector rack system 10 preferably has the same rotatable feed conduit and variable orificing features on the other side of the manifold 26 for variably restricting flow into the other thruster 20. By providing variable orificing for both thrusters 20, 22, flow may be variably apportioned between the two thrusters 20, 22 in an infinitely adjustable manner. For example, if both variable orifices permit substantially complete flow stoppage, as is the case when the orifices are defined by two half-circle openings as described above, then the flow split between the thrusters 20, 22 may be varied between one extreme defined by substantially zero flow into thruster 20 and substantially all of the flow into thruster 22, and the opposite extreme defined by substantially all of the flow into thruster 20 and substantially zero flow into thruster 22. If desired, the two feed conduits 28, 30 may be rotationally positioned relative to each other in a fixed relationship and mechanically coupled to rotate together so that the fixed relationship is maintained as they are rotated, thereby permitting simultaneous adjustment of the flow split between the thrusters 20, 22.

The feed conduits 28, 30 preferably also include Hi indexing mechanisms for placing and securing each of the feed conduits in one or more predetermined rotational positions with respect to the receivers. In the embodiment shown in FIG. 2, the indexing mechanism for the feed conduit 30 includes a series of detents 78 in a radial flange 80 on the fitting 52 at the exit end of the feed conduit and circumferentially spaced therearound, and a pin 82 fixed on the receiver 34 for selectively engaging one of the detents 78. When it is desired to rotate the conduit 30 from one predetermined rotational position to another, the conduit 30 is urged longitudinally toward the manifold 26 against the biasing force of the spring 74 so that the pin 82 disengages the detent 78, and the conduit is rotated in the desired direction until pin 82 is approximately aligned with the detent 78 corresponding to the desired new position of the feed conduit 30, whereupon the feed conduit 30 is released and, if necessary, rotated slightly one direction or the other to insure that the pin 82 engages the new detent 78. If desired, the receiver 34 and feed conduit 30 may include indicia or markings to facilitate indexing the feed conduit 30 to the predetermined positions.

In use in an ejector rack such as that shown in FIG. 1, the variable flow-apportioning device of the invention is used in the following manner. With the ejector rack 10 suitably mounted to the aircraft structure such that the thruster 22 is forward and the thruster 20 is aft, and a store 12 suspended by the ejector and positioned to be jettisoned in a downward direction in FIG. 1, it is first determined what relative force or energy is to be imparted to the forward and aft ends of the store 12 by the thrusters 22 and 20, respectively, in order to eject the store 12 with a desired linear acceleration and, if desired, to impart a predetermined angular acceleration or pitch rate to the store 12. The requisite rotational positions of feed conduits 30 and 28 are then determined based on predetermined correlations between the energy levels to be imparted and the rotational positions of the feed conduits 30 and 28, which may be empirically derived. The forward feed conduit 30 and aft feed conduit 28 are placed in the requisite rotational positions relative to their respective receivers 34 and 32. At the moment when the store 12 is to be ejected, the actuating means 18 is operated to disengage the suspension hooks 16 from the store 12, and simultaneously or very slightly later pressurized gas stored in accumulator 24 is discharged therefrom into the manifold 26. The pressurized gas flows through feed conduits 30 and 28 into receivers 34 and 32 and into fore and aft thrusters 22 and 20, causing the extendable rams (not shown) to be rapidly extended to forcibly eject the store 12 with the desired linear and angular accelerations.

While the invention has been illustrated and described by reference to a particular embodiment thereof, and while this embodiment has been described in considerable detail, other embodiments of the invention which fall within the scope of the appended claims may be readily made by persons of ordinary skill in the art. For example, the illustrated embodiment depicts the eccentric flow passage 62 as being at the exit end 52 of the feed conduit 30 and the receiver 34 as having the eccentric receiver port 66 in order to form the variable orifice 68. However, those of ordinary skill in the art will appreciate that the variable orifice may alternatively be provided at the inlet end 42 of the feed conduit 30, such as by providing the inlet end 42 with an eccentric inlet passage and by providing the manifold 26 with a mating face having an eccentric exit port which cooperates with the inlet end of the feed conduit to create a variable flow orifice. Other modifications may also be made without departing from the scope of the claims. Accordingly, the scope of the invention is to be determined by reference to the appended claims.

What is claimed is:

1. A flow-restricting device for an aircraft rack ejector system having at least one fluid-actuated thruster operated by pressurized fluid from a source, the flow-restricting device comprising:

a manifold adapted to be coupled to said source so as to receive pressurized fluid therefrom, the manifold defining a supply passage for supplying pressurized fluid;

a receiver adapted to supply the pressurized fluid to the fluid-actuated thruster;

a feed conduit having a first end connected to the receiver and a second end slidably received into the supply passage of the manifold such that a fluid-tight connection is established between the supply passage and the feed conduit, the feed conduit having a longitudinal axis and being rotatable thereabout, the first end defining a fluid flow passage which is eccentric relative to the longitudinal axis, the feed conduit including a flange;

the receiver including a mating face opposing the first end of the feed conduit and defining a port in the mating face adapted to supply pressurized fluid to the thruster;

the first end of the feed conduit being coupled with the mating face such that the port is eccentric relative to the longitudinal axis of the feed conduit, whereby rotation of the feed conduit about the longitudinal axis causes varying degree of overlap between the fluid flow passage and the port so as to define a variable-size flow orifice; and a compression spring disposed between the manifold and the flange on the feed conduit, the spring biasing the feed conduit so as to seat the first end thereof against the mating face in fluid-tight relation.

2. A flow-restricting device for an aircraft rack ejector system having at least one fluid-actuated thruster operated by pressurized fluid from a source, the flow-restricting device comprising:

a manifold adapted to be coupled to said source so as to receive pressurized fluid therefrom, the manifold defining a supply passage for supplying pressurized fluid;

a receiver adapted to supply the pressurized fluid to the fluid-actuated thruster;

a feed conduit having a first end connected to the receiver and a second end slidably received into the supply passage of the manifold such that a fluid-tight connection is established between the supply passage and the feed conduit, the feed conduit having a longitudinal axis and being rotatable thereabout, the first end defining a fluid flow passage which is eccentric relative to the longitudinal axis;

the receiver including a mating face opposing the first end of the feed conduit and defining a port in the mating face adapted to supply pressurized fluid to the thruster;

the first end of the feed conduit being coupled with the mating face such that the port is eccentric relative to the longitudinal axis of the feed conduit, whereby rotation of the feed conduit about the longitudinal axis causes varying degree of overlap between the fluid flow passage and the port so as to define a variable-size flow orifice; and the internal diameter of the feed conduit decreasing from the second end to the first end of the conduit, whereby a biasing force is exerted on the feed conduit by fluid pressure acting on internal surfaces of the feed conduit, the biasing force urging the first end of the feed conduit against the mating face in fluid-tight relation.

3. The flow-restricting device of claim 2, further comprising a compression spring which is disposed between the manifold and a flange on the feed conduit, whereby the biasing force is supplied by a combination of fluid pressure acting on internal surfaces of the feed conduit and a spring force provided by the compression spring.

4. The flow-restricting device of claim 3, further comprising an indexing mechanism including circumferentially spaced detents adjacent the first end of the feed conduit and at least one engaging member on the receiver which selectively engages one of the detents for placing and locking the feed conduit in a predetermined position with respect to the receiver port.

5. The flow-restricting device of claim 3 wherein the first end of the feed conduit defines an exit flow passage, and the receiver port and the exit flow passage are each configured as half of a circular opening having a center on the longitudinal axis of the feed conduit, such that the feed conduit may be rotated from a fully open position in which the receiver port and exit flow passage are generally coincident with each other, to a fully closed position in which the receiver port and exit flow passage do not overlap.

6. A flow-apportioning device for variably apportioning pressurized fluid from a source to first and second fluid-actuated thrusters of an aircraft rack ejector system, the flow-apportioning device comprising:

a manifold adapted to be coupled to said source so as to receive pressurized fluid therefrom;

first and second receivers adapted to supply the pressurized fluid to the first and second fluid-actuated thrusters, respectively, each receiver including a mating face and a receiver port originating at the mating face;

first and second feed conduits coupled between the manifold and the first and second receivers, respectively, each feed conduit having a longitudinal axis and being rotatable thereabout, each feed conduit having an inlet end coupled to the manifold and an exit end coupled to the respective receiver, the exit end of each feed conduit defining an exit flow passage which is eccentric relative to the respective longitudinal axis;

the exit end of each feed conduit being coupled with the mating face of the corresponding receiver such that the receiver port is eccentric relative to the longitudinal axis of the feed conduit, each feed conduit being rotatable about its longitudinal axis so as to cause varying degree of overlap between the exit flow passage and the receiver port to define a variable-size flow orifice;

whereby pressurized gas supplied to the manifold may be selectively apportioned between the first and second fluid-actuated thrusters by rotating the first and second feed conduits to predetermined positions defining predetermined desired flow orifice sizes.

7. The flow-apportioning device of claim 6 wherein the exit flow passages and receiver ports are configured such that in predetermined rotational positions of the feed conduits a maximum flow orifice size occurs at one of the receivers and a minimum flow orifice size occurs at the other receiver.

8. The flow-apportioning device of claim 7 wherein the feed conduits can be rotated to second predetermined positions in which a minimum flow orifice size occurs at said one of the receivers and a maximum flow orifice size occurs at the other receiver.

9. The flow-apportioning device of claim 8 wherein the minimum flow orifice size for each receiver provides substantially complete blockage of flow into the respective receiver.

10. The flow-apportioning device of claim 6 wherein the mating face of each receiver lies within a female receptacle into which the exit end of the respective feed conduit slidably fits, and wherein each feed conduit is biased toward the respective mating face so as to seat the exit end against the mating face in fluid-tight relation.

11. The flow-apportioning device of claim 10 wherein the exit end of each feed conduit includes detents which are circumferentially spaced and the female receptacle of the respective receiver includes at least one engaging member which selectively engages one of the detents for placing and locking the respective feed conduit in a predetermined position with respect to the receiver port.

12. The flow-apportioning device of claim 10 wherein the manifold includes first and second supply passages slidably receiving the inlet ends of the first and second feed conduits, respectively, in fluid-tight relation so that a fluid-tight connection is maintained between the manifold and the feed conduits during rotation and translation of the feed conduits within the supply passages.

13. The flow-apportioning device of claim 12 wherein each feed conduit includes a flange adjacent the manifold, and further comprising compression springs disposed between the manifold and the flanges for biasing the feed conduits toward the respective receivers.

14. The flow-apportioning device of claim 13 wherein the internal diameter of each feed conduit decreases from the inlet end to the exit end, whereby fluid pressure acting on inner surfaces of the feed conduits biases the feed conduits toward the respective receivers.

15. A method of variably apportioning a supply flow of pressurized fluid between first and second fluid-actuated devices, comprising:

introducing the supply flow of pressurized fluid into a manifold having first and second manifold exits;

supplying pressurized fluid from the first and second manifold exits through first and second feed conduits, respectively, each of the feed conduits being rotatable with respect to the manifold about a longitudinal axis of the feed conduit, each feed conduit having an exit end defining an exit flow passage which is eccentric relative to the respective longitudinal axis;

positioning the exit ends of the first and second feed conduits in opposing fluid-tight relation with first and second mating faces of first and second receivers, respectively, the first and second receivers being adapted to supply pressurized fluid to the first and second fluid-actuated devices, respectively, each mating face having a receiver port originating therein, each feed conduit being positioned such that the respective receiver port is eccentric relative to the longitudinal axis of the respective feed conduit; and varying the rotational positions of the feed conduits with respect to the receivers so as to cause varying degree of overlap between the exit flow passages of the feed conduits and the receiver ports, thereby varying the rate of flow of pressurized fluid into each receiver port.

16. The method of claim 15 wherein the rotational positions of the first and second feed conduits are independently varied.

17. The method of claim 15 wherein the step of varying the rotational positions of the first and second feed conduits comprises maintaining a fixed relationship between the rotational positions of the feed conduits, and rotating the feed conduits in unison to vary the rotational positions of the feed conduits with respect to the receivers.

* * * * *